Patented Jan. 22, 1935

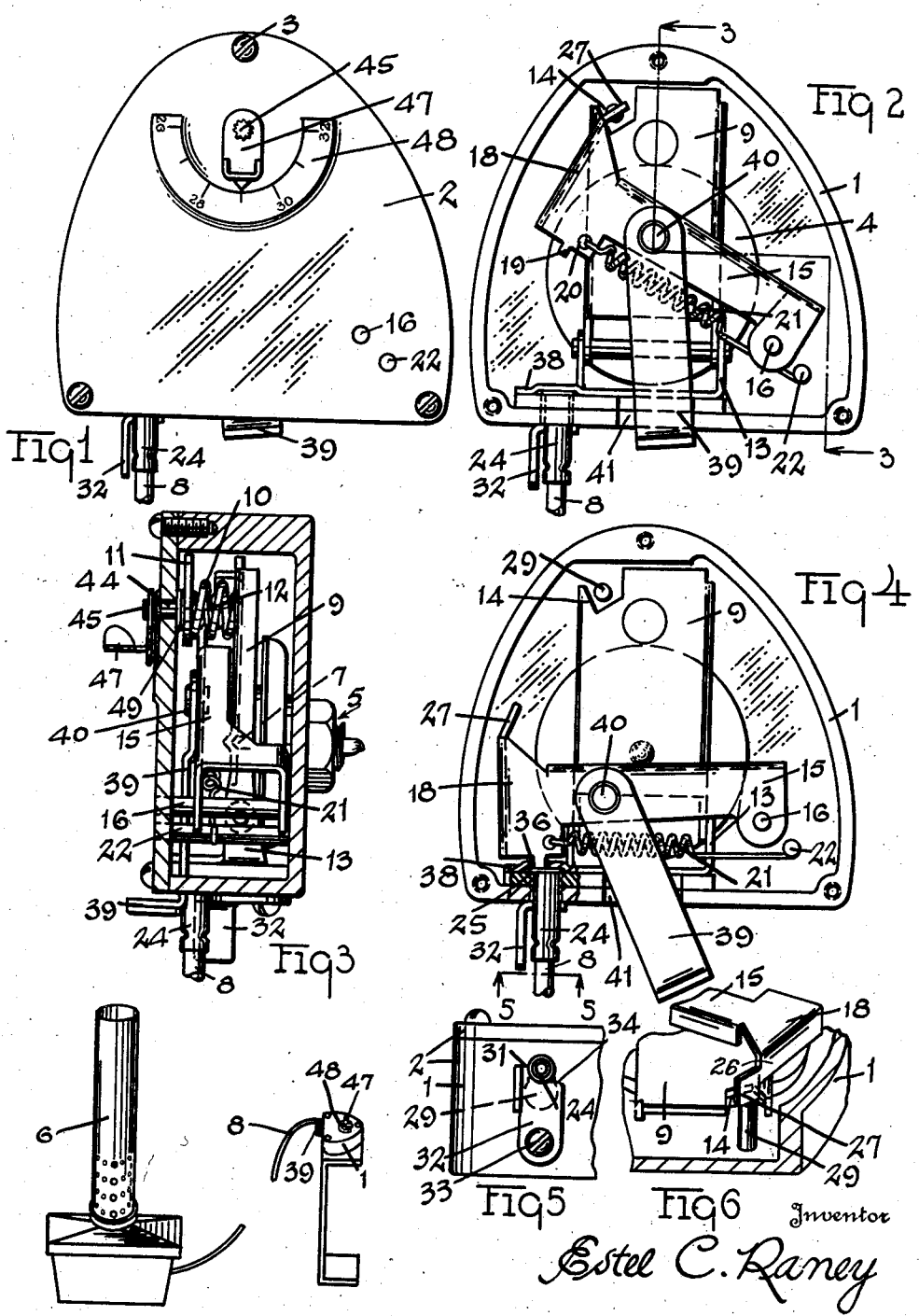

1,988,512

UNITED STATES PATENT OFFICE 1,988,512

AUTOMATIC ORCHARD HEATER IGNITER

Estel C. Raney, Columbus, Ohio

Application September 22, 1933, Serial No. 690,603

3 Claims. (Cl. 67—3)

My invention has for its object to provide thermo-responsive means for automatically igniting orchard heaters.

My invention has for its object to provide means whereby the heater igniter may be adjusted to operate at a predetermined temperature. When the temperature of the atmosphere reaches a predetermined point, a cartridge is automatically detonated, and the burning fuse attached thereto ignites the orchard heater. Thus it will be seen that heaters in an orchard may be automatically ignited when the temperature reaches a predetermined point, and the dangers of loss of the crop due to delay, possible negligence, or the time involved in manual ignition will be entirely eliminated.

The heater igniters may be so adjusted that only the number of heaters necessary to raise the temperature of the atmosphere beyond the danger point will be ignited, and additional heaters may be ignited as the temperature falls. By adjusting the heater igniters to varying temperatures, adequate protection for several decreases in atmospheric temperature is insured, while fuel costs are reduced to a minimum.

As is well known, temperature conditions are not identical throughout an orchard, particularly orchards located on rolling ground. Trees at the edges of an orchard are more liable to injury than those in the inner regions of the orchard where the trees are more or less protected by the adjacent trees and their branches. Those trees, however, on the outer edges of the orchard are unprotected and receive the full blast of the wind. Heater igniters used to protect those trees at the edges of the orchard may be so adjusted that the heaters will be ignited at slightly higher temperatures, thus protecting the outer trees, notwithstanding their exposure to the wind.

Through the adjustment means, heater igniters may be used successfully to protect trees located on the crests of hills and consequently liable to frost damage and those trees located in the narrow valleys. The heater igniter provides safe and adequate protection to the trees by its adjustment means, regardless of the location of the trees and the topography of the earth about the orchard.

The invention contains other features and advantages which will appear from the following description and upon examination of the drawing. Structures containing the invention may partake of different forms and may be varied in their details and still embody the invention. To illustrate a practical application of the invention, I have selected an orchard heater igniter embodying the invention as an example of the various structures and details of such structures that contain the invention and shall describe the selected igniter hereinafter, it being understood that variations may be made without departing from the spirit of the invention. The particular structure selected is shown in the accompanying drawing.

Fig. 1 is a view of the shell of the heater igniter, showing the adjustment indicator. Fig. 2 is a view of parts of the detonating device, the face plate being shown removed. Fig. 3 illustrates a view of a section taken on the plane of the line 3—3 indicated in Fig. 2 and particularly illustrates a side view of the detonating mechanism. Fig. 4 is a view illustrating the location of parts of the detonating device as the cartridge is detonated. Fig. 5 is a view of a section taken on the plane of the line 5—5 indicated in Fig. 4 and particularly shows the means of securing the cartridge in the shell. Fig. 6 is a fragmentary view of the trip or latch mechanism of the detonator. Fig. 7 is a perspective view of the orchard heater igniter and an orchard heater of the well-known type.

The orchard heater igniter device is contained in a shell 1 to which a removable face plate 2 is fastened by suitable bolts or rivets 3. An expansible wafer 4, containing a thermo-responsive fluid is secured to the shell 1 by the bolt and nut 5. Protruding from the wafer 4 is a pin 7 against which a latch lever 9 is forced by an adjustable helical spring 10, the tension of which is maintained by a plate 11 internally threaded to receive a screw 12 which extends through the face plate 2. The latch lever 9 is pivoted on a bracket 13 contained in the shell 1 and has a latch 14 adapted to support a hammer 15.

The hammer 15 is freely pivotable on a pin 16 contained in the shell and has a head 18 from which protrudes a firing lug or pin 19. Fastened to the head 18 of the hammer through a suitable eye 20 is a tension spring 21, the other end of which is secured to a pin 22 contained in the shell. The pressure of the spring 21 tends to force the firing pin 19 against the cartridge 24 in the cartridge chamber 25.

The head 18 of the hammer has a shoulder 26 having a protruding part 27 adapted to be engaged by the latch 14 of the latch lever.

When the temperature of the surrounding atmosphere lowers, the thermo-responsive fluid in the wafer 4 tends to contract, the expansible wafer contracting simultaneously and proportionately. When the contraction of the fluid in the wafer is such that the pressure of the wafer against the latch lever 9 is less than the tension of the spring 10 against the latch lever, the lever is forced toward the wafer due to the pressure of the spring 10. Movement of the hammer 15 in the direction of the latch lever is prevented by a pin 29, one end of which is contained in the shell, and the other end of which supports the protruding part 27 of the hammer head. The movement of the latch lever toward the wafer releases the protruding part 27 of the hammer from the latch 14, and the spring 21 forces the firing pin 19 of the hammer against the cartridge in the cartridge chamber, which ignites the fuse that leads to and ignites the orchard heater.

In order that the igniter may be easily and conveniently reloaded, the cartridge chamber 25 is provided with an opening 29 in the shell 1 of sufficient size to receive the flanged end of the cartridge. Connected to the opening 29 is a slot 31 having a diameter substantially that of the cylinder of the cartridge. Thus the cartridge is easily inserted in the opening 29 and may be subsequently moved to the slot 31. In order that the cartridge may be maintained in position in the slot 31, a bar 32 is pivoted at 33 and is curvedly cut out as at 34 to conform substantially to the curvature of the cylinder of the cartridge. The bar 32 is pivoted so as to maintain the cartridge in position by convenient handle parts. The depth of insertion of the cartridge in the cartridge chamber is limited by the stop 38, which has a central opening 36 through which the firing pin 19 extends to detonate the cartridge when the hammer is tripped. It will be seen that not only is the cartridge readily insertable in the cartridge chamber, but accuracy of placement in the chamber is mechanically assured, thereby insuring detonation of the cartridge when the firing pin is released.

After the cartridge has been detonated, the igniter may be easily re-set by manipulation of a re-setting plunger 39 which is pivoted at 40 on the hammer 15 and protrudes through a slot 41 of the shell. After the cartridge is detonated, the protruding part 27 of the shoulder of the hammer may be forced into engagement with the latch 14 of the latch lever by the action of the re-setting plunger against the hammer when the resetting plunger is manually forced upwardly.

The heater igniter may be adjusted to operate at a predetermined temperature. Through the use of the adjusting device, the several igniters of an orchard may be adjusted to operate at various temperatures, so that a desired number of heaters may be ignited at the desired temperature to raise the temperature of the air to a safe level and in desired areas, and additional groups of heaters may be ignited if the temperature continues to fall. Such adjustment of heater igniters in an orchard insures adequate protection of the trees at all temperatures at a minimum expenditure of fuel.

The adjustment means consists in a plate 11 internally threaded to receive a threaded post or screw 12 which is journaled in the face plate 2 and fastened thereto by washers 49. One edge of the plate 11 substantially abuts the inner surface of the shell 1 and the inner surface of the shell acts as a guide surface over which the plate moves longitudinally when the post is rotated. Fastened to the head 45 of the post is an indicator pointer 47 which is movable relative to a dial 48. Movement of the pointer 47 with respect to the dial causes rotation of the post 12. Rotation of the post causes longitudinal movement of the plate 11 with respect to the axis of the post along the inner surface of the shell, which adjusts the tension of the spring 10. As the spring tension is decreased, the temperature at which the cartridge is detonated is lowered.

I claim:

1. In an orchard heater igniter, a shell, a thermically expansible wafer, a spring pressed lever operated by the expansible wafer, a spring pressed hammer supported for pivotal movements about an axis extending in a direction at right angles to the direction in which the axis of the lever extends, the lever and the hammer having inter-engaging parts, the lever when operated by the contraction of the wafer releasing the engaging part of the hammer from the engaging part of the lever, a fuse, a cartridge connected to the said fuse for igniting the fuse and means for securing the cartridge in position in the shell for flashing the cartridge when the hammer is released.

2. In an orchard heater igniter, a shell, a thermically expansible wafter, a spring pressed lever operated by the said expansible wafer, a spring pressed hammer, the lever and the hammer having inter-engaging parts, a stop for engaging the said hammer as the wafer contracts and operative to release the hammer from the lever, a fuse, a cartridge connected to the said fuse for igniting the fuse, and means for securing the cartridge in position in the shell for flashing the cartridge when the hammer is released.

3. In an orchard heater igniter a shell, a thermically expansible wafer, a lever engaged on one side by the wafer, a spring for engaging the lever, a threaded screw for adjusting the pressure of the spring on the lever counter the pressure of the wafer, a dial pointer connected to the screw, a hammer located on the side of the lever opposite the side on which the wafer is located and movable transverse the direction of movement of the lever, the hammer and the lever having inter-engaging lugs, a limiting stop for engaging the hammer as the lever moves by contraction of the wafer to release the lug of the hammer from the lug of the lever, a fuse, a cartridge connected to the fuse for igniting the fuse, means for securing the fuse in the shell, and a spring for operating the hammer to flash the fuse when the hammer is released.

ESTEL C. RANEY.